United States Patent [19]

Nelson

[11] Patent Number: 5,005,170
[45] Date of Patent: Apr. 2, 1991

[54] MULTI-RATE MULTIPLEXING ARRANGEMENT EFFICIENTLY UTILIZING MULTIPLEXED CHANNEL BANDWIDTH

[75] Inventor: Donald R. Nelson, Boulder, Colo.
[73] Assignee: AT&T Bell Laboratories, Murray Hill, N.J.
[21] Appl. No.: 462,361
[22] Filed: Jan. 9, 1990
[51] Int. Cl.⁵ ............................................... H04J 3/22
[52] U.S. Cl. .................................... 370/84; 370/58.1; 370/87; 370/117; 370/63
[58] Field of Search ................... 370/84, 112, 82, 58.1, 370/58.2, 58.3, 63, 95.1, 79, 99, 85.1, 85.7, 110.1, 118; 375/38, 117

[56] References Cited

U.S. PATENT DOCUMENTS

| | | | |
|---|---|---|---|
| 3,988,544 | 10/1976 | Texier et al. | 179/15 BV |
| 4,206,322 | 6/1980 | Lurtz | 370/63 |
| 4,485,468 | 11/1984 | Slana | 370/58 |
| 4,547,877 | 10/1985 | Lehman et al. | 370/58 |
| 4,577,312 | 3/1986 | Nash | 370/84 |
| 4,589,108 | 5/1986 | Billy | 370/112 |
| 4,658,152 | 4/1987 | Walters | 370/84 |
| 4,716,561 | 12/1987 | Angell et al. | 370/84 |
| 4,718,058 | 1/1988 | Van Vugt | 370/63 |
| 4,727,536 | 2/1988 | Reeves et al. | 370/84 |
| 4,805,165 | 2/1989 | Kawamura et al. | 370/84 |
| 4,852,089 | 7/1989 | Berry et al. | 370/58.1 |
| 4,891,805 | 1/1990 | Fallin | 370/95.1 |

OTHER PUBLICATIONS

T. H. Murray, "The Evolution of DDS Networks: Part I", *Telecommunications*, 2-89, pp. 39-40, 42, 44, and 46-47.
CCITT, "Proposed Text for Draft Recommendation V. 120", pp. 1-26 and Appendix 1.

Primary Examiner—Douglas W. Olms
Assistant Examiner—Alpus H. Hsu
Attorney, Agent, or Firm—David Volejnicek

[57] ABSTRACT

In a subrate-multiplexed telecommunication system that handles subchannels of different rates and hence assigns a plurality of time slots within a frame to at least some subchannels, time slots with a frame of a subrate multiplexed channel are assigned to an individual subchannel arbitrarily, without constraint on the location within the frame of the time slots assigned to the individual subchannel. The only constraint that is observed is that, when switching the signal stream of a subchannel from one subrate-muliplexed signal stream to another, the relative time ordering of the subchannel's signals carried by the subchannel's assigned time slots in the one subrate-multiplexed signal stream is preserved when the subchannel's signals are switched into the subchannel's time slots in the other subrate multiplexed signal stream.

34 Claims, 7 Drawing Sheets

MULTI-RATE MULTIPLEXING ARRANGEMENT EFFICIENTLY UTILIZING MULTIPLEXED CHANNEL BANDWIDTH

CROSS-REFERENCE TO RELATED APPLICATION

Concurrently filed herewith and assigned to the same assignee as this application is application of D. R. Modisette and D. R. Nelson, entitled "Improved Telecommunication Transmission Format Suited For Network-Independent Timing Environments." Ser. No. 07/462,374. The related application shares a substantially common disclosure with this application.

TECHNICAL FIELD

This invention relates generally to multiplexing (including demultiplexing), and relates specifically to the subrate multiplexing of multiple signal streams having different transmission rates.

Background of the Invention

Multiplexing is a technique that allows a plurality of signal streams or channels to be transmitted via a common channel or path. Time-division multiplexing allows the plurality of channels to share the common channel by assigning different ones of the plurality of channels to use the common channel at different times. In statistical multiplexing, the plurality of channels are connected to the common channel on a statistical basis, i.e., according to need. Typically, the signals from different ones of the plurality of channels that are successively transmitted on the common channel are separated on the common channel by idle periods of arbitrary duration. Consequently, the signals must be delimited by identifiers that indicate when the signals start and stop. Also, there is no a priori, predetermined, sequence in which the channels are connected to the common channel. Consequently, the signals from any one of the plurality of channels that are transmitted on the common channel during any time interval must include explicit addressing information that identifies either the source or the destination of those signals.

In contrast, in subrate multiplexing, the plurality of channels are connected to the common channel during adjacent successive time intervals, or time slots, in a predetermined order that forms a repeating pattern of fixed duration, called a frame. Because the time slots are adjacent, i.e., not separated by idle intervals, transmissions of signals from individual ones of the plurality of channels are delimited by the beginning and end of the individual time slots and hence need no other delimiters. Also, any changes in the relative order of transmission on the common channel, such as substitution of one or more of the plurality of channels for another one or more of the plurality of channels in using one or more of the time slots of a frame, must be made known by the transmitter (the multiplexer) to the receiver (the demultiplexer) prior to the change being effected. Consequently, the one of the plurality of channels that is the source of the signals transmitted during any time slot is identifiable from the position of those signals within the frame, and hence the signals need not include explicit addressing information.

Subrate multiplexing is well known in the art. Typically, it involves the combining through time-division techniques of a plurality of independent communication signal streams intended for transmission over a common communication channel and each one of which has a bandwidth, i.e., a transmission rate, that is lower than, i.e., that is a subrate of, the bandwidth of the common channel, into a single signal stream having the common channel's bandwidth. For example, it is common to combine the signal streams of up to 20 subchannels, each having a bandwidth of 2.4 kilobits per second (Kbps) plus associated control signals (e.g., framing information), into a single ISDN B or DS0 channel signal stream having a total bandwidth of 64 Kbps by using a different one of each 20 successive time slots of the ISDN B or DS0 channel to carry the data signals and associated control signals of a different one of the 20 2.4 Kbps subchannels. 48 Kbps are thus used to carry data signals and the remaining 16 Kbps are used for control and other overhead.

When subchannels that are to be subrate-multiplexed do not all have the same transmission rate, different numbers of time slots within a frame are assigned to channels having different transmission rates. Each time slot is referred to as a basic bandwidth unit, and each subchannel is assigned as many basic bandwidth units as necessary to at least equal that subchannel's transmission rate. Using the above scenario as an example, where a basic bandwidth unit constitutes 2.4 Kbps, subrate channels having a transmission rate of up to 2.4 Kbps are each assigned a single basic bandwidth unit or time slot, subrate channels having a transmission rate of up to 4.8 Kbps are each assigned two basic bandwidth units or time slots, subrate channels having a transmission rate of up to 9.6 Kbps are each assigned four basic bandwidth units or time slots, and so on.

It is often the case in switched-communications networks that a multiplexed channel is demultiplexed and its constituent subchannels are remultiplexed with constituent subchannels of other multiplexed-channels. Consequently, it is necessary for the switching intelligence to keep track of which time slots of a frame constitute the same subchannel, so that these time slots will be switched together and so that the relative time ordering of the time slots of a subchannel will be preserved. To meet these constraints, the prior art imposes restrictions on how time slots may be assigned to subchannels within a frame. Two types of restrictions have come to be common. Under one constraint, the time slots assigned to a subchannel must be adjacent to each other within a frame. Under the other constraint, the time slots assigned to a subchannel must be periodically, i.e., symmetrically with equal time intervals between assigned time slots, distributed within a frame.

Unfortunately, these restrictions produce inefficiencies of multiplexed-bandwidth usage. Specifically, a multiplexed channel may have unused bandwidth, i.e., a sufficient number of unused time slots, to accommodate a particular subchannel, but, because the location of those time slots within the frame does not meet the abovementioned constraints, the multiplexed channel is in fact unable to carry the subchannel and the bandwidth goes unused and is wasted.

Summary of the Invention

This invention is directed to overcoming the disadvantages of the prior art. According to the invention, in a subrate-multiplexing arrangement that handles subchannels of different transmission rates and hence assigns a plurality of time slots within a frame to at least some subchannels, time slots within a frame of a subrate-multiplexed channel are assigned to an individual subchannel arbitrarily, without constraint on the location within the frame of the time slots assigned to the individual subchannel. Specifically, contrary to the prior art, the time slots within a frame that are assigned to a single subchannel need not be either contiguous or periodically distributed within the frame. The only constraint that is observed is that, when switching the signal stream of a subchannel from one subrate-multiplexed signal stream to another, the relative time ordering of the subchannel's signals carried by the subchannel's assigned time slots in the one subrate-multiplexed signal stream is preserved when the subchannel's signals are switched into the subchannel's assigned time slots in the other subrate-multiplexed signal stream. The relative time ordering is preserved preferably by mapping sequentially-occurring time slots assigned to the subchannel in a frame of the one subrate-multiplexed signal stream to sequentially-occurring time slots that are both (a) assigned to the subchannel in one frame, or more than one adjacent frames, of the other subrate-multiplexed signal stream and (b) each occurring no earlier in time than its mapped time slot of the one subrate-multiplexed signal stream.

As a consequence of the invention, the bandwidth of a subrate-multiplexed channel may be used more efficiently than has hitherto been possible: the subrate-multiplexed channel can carry a subchannel so long as it has idle time slots of bandwidth at least equal to the subchannel's bandwidth, irrespective of the distribution of those idle time slots within a frame. Yet the proper sequence of the subchannel's information carried by the time slots from source to destination is preserved even if the subchannel's assigned time slots are switched along the way from one subrate-multiplexed channel to another.

These and other advantages and features of the present invention will become more apparent from the following discussion of an illustrative embodiment of the invention taken together with the drawing.

DETAILED DESCRIPTION

Figure 1:
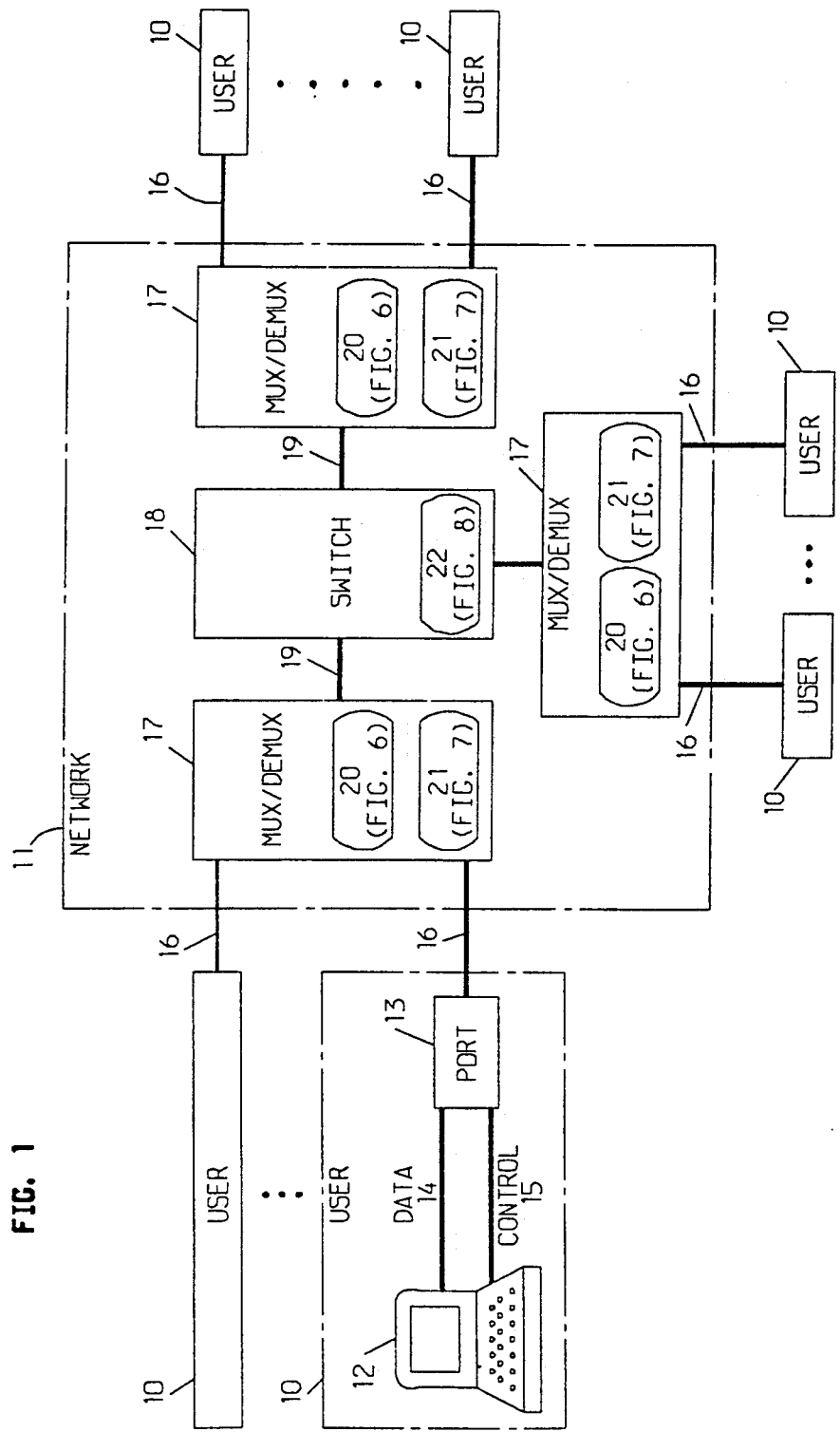
FIG. 1 is a block diagram of a telecommunication system that includes an illustrative embodiment of the invention.

FIG. 1 shows an illustrative communications system. It is made up of two distinct portions: user premises equipment, referred to herein simply as user 10, and network equipment, referred to herein simply as network 11. Network 11 interconnects a plurality of users 10. Each user 10 has one or more pieces of terminal equipment, such as computers, printers, display terminals, or data terminals and referred to herein generically as terminal 12, interfaced to network 11 by a port 13. Terminal 12 is connected to port 13 by a data link 14 and a control link 15. Any suitable format may be used for communications on links 14 and 15. Port 13 is in turn connected to network 11 by a user link 16. Port 13 formats data and control information received from terminal 12 on links 14 and 15, respectively, into bytes and transmits both control and data bytes on link 16 to network 11. Port 13 separates data and control bytes that it receives on link 16 from network 11, deformats them into their constituent data and control information, and transmits the data and control information separately on links 14 and 15 to terminal 12.

At network 11, a plurality of users 10 are connected by their user links 16 to a multiplexer/demultiplexer 17. Network 11 includes a plurality of multiplexer/demultiplexers 17 each serving a different group of users 10. Multiplexer/demultiplexers 17 are interconnected by at least one switch 18 in this example; in another common network configuration, switch 18 is eliminated and multiplexer/demultiplexers are interconnected directly with each other. Each multiplexer/demultiplexer 17 is connected to switch 18 by a network link 19. A multiplexer/demultiplexer 17 uses time-division multiplexing techniques to combine signal streams that it receives over user links 16 into a single multiplexed signal stream, which it then transmits over network link 19 to switch 18. In the opposite direction, multiplexer/demultiplexer 17 receives a time-division multiplexed signal stream from switch 18 over network link 19 and separates it into its constituent substreams which it then sends over user links 16 to their destination users 10. Switch 18 uses time-slot interchange techniques to switch substreams from multiplexed streams incoming on network links 19 into different multiplexed streams outgoing on network links 19.

As described so far, the system of FIG. 1 is conventional.

Figure 2:
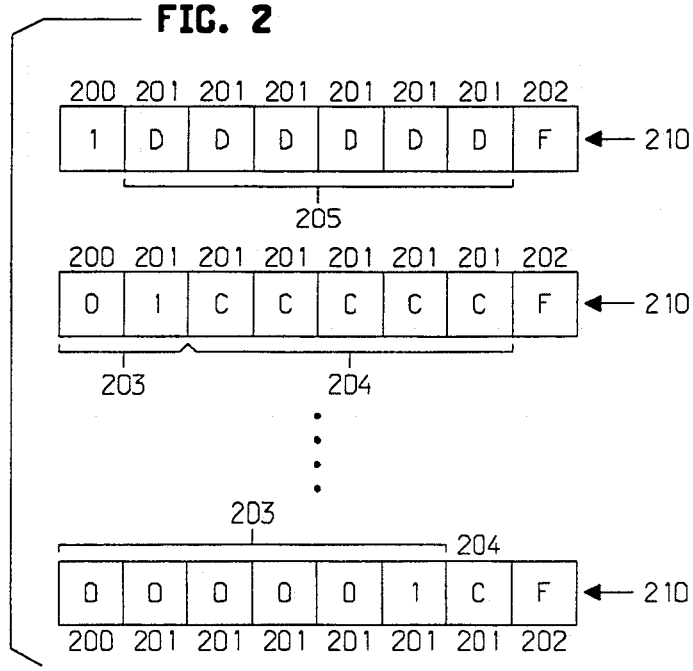
FIG. 2 shows block diagrams of the format of information bytes transported by the system of FIG. 1.

The format in which combined data and control information is communicated on user links 16 is shown in FIG. 2. Information is communicated in 8-bit bytes 210. A byte 210 is delimited by a control bit 200 at one end and a framing bit 202 at the other end, and in the middle contains 6 information bits 201. Consequently, the format of FIG. 2 is fully backward-compatible with the conventional DDS DS0 B format for multiplexed services. And while bit 202 is reserved for use as a framing bit in a multiplexed system such as that shown in FIG. 1, bit 202 may be used as an additional data bit in systems that do not use multiplexing, thereby also making the format of FIG. 2 fully backward-compatible with the conventional DDS DS0 A encoding format. The value of control bit 200 indicates whether information bits 201 carry data or control information. Control bit 200 value of 1 signifies that the next 6 information bits 201 form a data field 205 that carries user data. Control bit 200 value of 0 signifies that information bits 201 carry control information. But in a departure from the conventional, not all information bits 201 carry control information. Control bit 200 of value 0 and all subsequent information bits 201 up to and including the first subsequent bit of value 1 form an I.D. code field 203 that identifies the type of control information that is carried by the subsequent information bits 201, which form a control field 204. Since control bit 200 itself, or one of the bits 201 of I.D. code field 203, will have a value of one in each and every byte 210, it is immediately evident that the format of FIG. 2 meets the ones density requirements that are common to links 19 such as the conventional T1 links without imposing any constraints at all upon any of the bit values of the data or control information carried by those bytes 210.

I.D. code field 203 is from 2 to 6 bits 200 and 201 long, leaving from 5 to 1 bits 201 for control field 204. This means that I.D. code field 203 can specify five different codes. These can illustratively be used to specify, and hence distinguish between, five different types of control information. The 2-bit control code can have 32 different control values associated therewith in control field 204; the 3-bit control code can have 16 different associated control values; the 4-bit control code can have 8 different associated control values; the 5-bit control code can have 4 different associated control values; and the 6-bit control code can have 2 different associated control values. Adding all the possible control values together, it will be seen that the format of FIG. 2 can specify up to 62 different control values.

The following are examples of practical use that can be made of the control information-carrying capability of the format of FIG. 2. They illustrate the capability of this format to support a wide variety of standard communication protocols and signaling schemes.

If it is desired to pass through (i.e., transport) all control signals of the EIA RS-232C protocol or its equivalent CCITT V. 23 protocol, 26 control values are needed, one for each possible signal. These may be transported using the 2-bit I.D. code field 203 and 26 of the 32 available values of the corresponding 5-bit control field 204.

Typically, all of these control signals will not be needed and will not have to be passed through. If it is adequate to pass through only the five principal control signals, the 2-bit I.D. code field 203 may again be used, but this time each bit 201 of the corresponding 5-bit control field 204 may be assigned to transport the value of a corresponding control signal. The same arrangement may be used to transport the five control signals of the EIA RS-449 protocol.

If it is desired to pass through the control signals of the CCITT V. 35 protocol, 4 control values are needed, one for each possible signal. These may be transported using the 2-bit I.D. code field 203 and assigning four of the 5 bits 201 of the corresponding 5-bit control field 204 to carry the value of a corresponding control signal. This leaves 1 bit 201 of control field 204 unused: this bit may be used to carry either a clock-adjust control bit or a secondary channel. The clock-adjust control bit of the synchronized clock adjust (SCA) mechanism is used in the conventional DCP and DMI mode 2 protocols. This bit conveys to a distant endpoint instructions on how to adjust the transmitter clock, and is required to implement pass-through, or network-independent, timing for those applications where users 10 are not timed from network 11. The secondary channel is a feature of the DDS service that allows an additional mode of communication at a lower data rate: in the DDS service format, the secondary channel is implemented by "commandeering" control bit 200 of every third or less-frequent byte 210.

Alternatively, the clock-adjust control bit or the secondary channel may be carried in a separate control byte 210 having the 1-bit control field 204 and the corresponding 6-bit I.D. code field 203.

Of course, the control information carried by control bytes 210 need not be true control information but may be any desired information, including data information of secondary, tertiary, or other data channels.

Illustratively, control bytes 210 are transmitted on a link 16 either periodically interspersed among data bytes 210, or occasionally whenever their information content changes.

Multiplexed communications on links 19 may proceed at any suitable transmission rate, such as the DS1 rate of 1.5 Mbps, or the DS0 rate of 64 Kbps. For purposes of this illustrative example, the 64 Kbps rate is selected.

Figure 3:
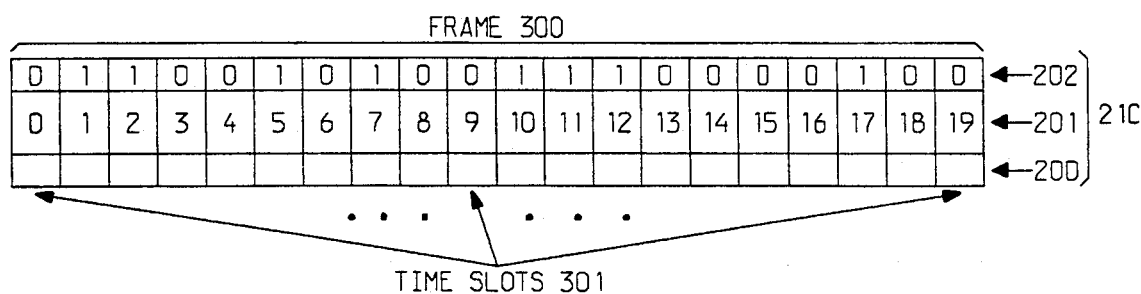
FIG. 3 is a block diagram of the format of a frame transported by the network of the system of FIG. 1.

For time-division subrate multiplexing purposes, the transmission rate, or bandwidth, of links 19 is subdivided into a plurality of basic bandwidth units each one of which occupies a single time slot. In this example, in order to maintain consistency and compatibility with the conventional DDS SDM multiplexing format, the 64 Kbps bandwidth of links 19 is divided into 20 basic bandwidth units of 2.4 Kbps each. Consequently, transmissions on links 19 take the form shown in FIG. 3. Transmissions proceed in sequential frames 300 each one of which includes 20 time slots 301 (numbered 0 through 19). Each time slot carries one byte 210. Framing bits 202 within a frame 300 form the 20-bit pattern shown in FIG. 3.

Signal streams, or subchannels, having a plurality of different rates that are subrates of the multiplexed rate of 64 Kbps may be multiplexed together and transmitted on links 19. A subchannel having a total subrate—for both data and control information bytes 210—up to 2.4 Kbps is assigned one time slot 301 within a frame 300; a subchannel having a total subrate up to 4.8 Kbps is assigned two time slots 301 within a frame 300; a subchannel having a total subrate up to 7.2 Kbps is assigned three time slots 301 within a frame 300; and so on.

In a communication system wherein users 10 are operating under network-independent timing, the actual subchannel rate may fluctuate about the nominal rate from the viewpoint of network 11, as a consequence of the difference between user 10 and network 11 clock rates. Hence, the maximum allowable deviation of the actual rate from the nominal rate must be determined and sufficient bandwidth must be assigned to the subchannel to handle this worst-case actual rate. According to the invention, however, this does not mean that bandwidth equal to or in excess of the highest-possible data rate plus the highest-possible control rate must be assigned to the subchannel. The invention takes advantage of the fact that control information is typically not highly time-sensitive and hence the rate of its transmission may be varied, and particularly reduced, without substantially any adverse consequences. Therefore, according to the invention, the bandwidth requirements of a subchannel are calculated as follows: the subchannel is assigned as many basic bandwidth units as necessary to at least equal the sum of (a) the worst-case, i.e., highest anticipated actual data transmission rate and (b) the best-case, i.e., lowest acceptable, control transmission rate. In the vast majority of typical situations, it is expected that the number of bandwidth units required to be assigned to a subchannel will be the number required to handle the nominal data transmission rate plus one. Then, during actual operation, the full amount of bandwidth that is required to handle the present actual data rate is assigned to data transmissions, and all remaining bandwidth of the bandwidth that has been assigned to the subchannel is used for control transmissions. This typically results in a periodic alternation between bytes 210 of data and control information in the signal stream representing a single subchannel on a link 19.

Figure 4:
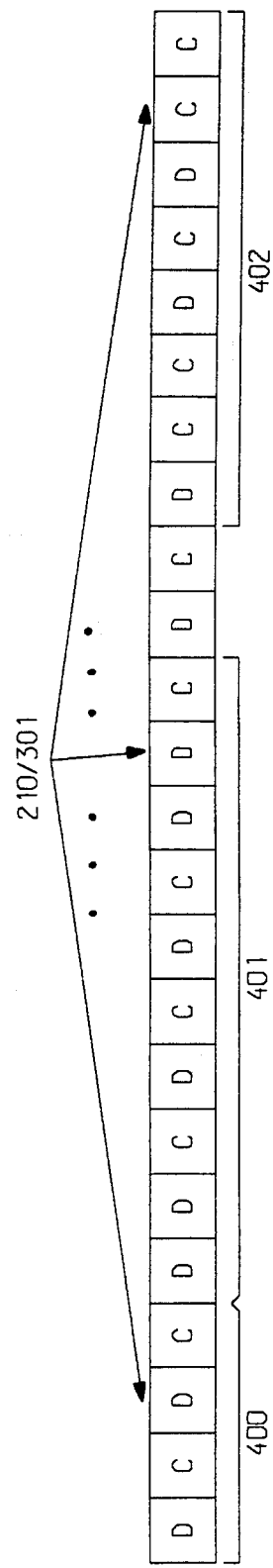
FIG. 4 is a block diagram of an illustrative sequence of a single subchannel's time slots generated by a multiplexer of the system of FIG. 1.

To illustrate this point, reference is made to FIG. 4. It shows an example of the succession of bytes 210 representing a single subchannel having a nominal data transmission rate of 2.4 Kbps that may be found in the multiplexed signal stream of link 19. When the actual data rate equals the nominal rate, time slots 301 carrying data bytes 210, designated by "D", are seen to alternate with time slots 301 carrying control bytes 210, designated by "C", as shown by the portion of the subchannel signal stream designated as 400. When the actual data rate increases above the nominal rate, occasionally additional data bytes 210 are transmitted to handle the excess data, resulting in two adjacent time slots 301 carrying data bytes 210, as shown by the portion of the subchannel signal stream designated as 401. When the actual data rate decreases below the nominal rate, occasionally additional control bytes 210 are transmitted to fill in for the lack of data, resulting in two adjacent time slots 301 carrying control bytes 210, as shown by the portion of the subchannel signal stream designated as 402. Similar fluctuations in the periodicity of alternations between time slots 301 carrying data bytes 210 and those carrying control bytes 210 would be found at other subchannel rates.

Figure 5:
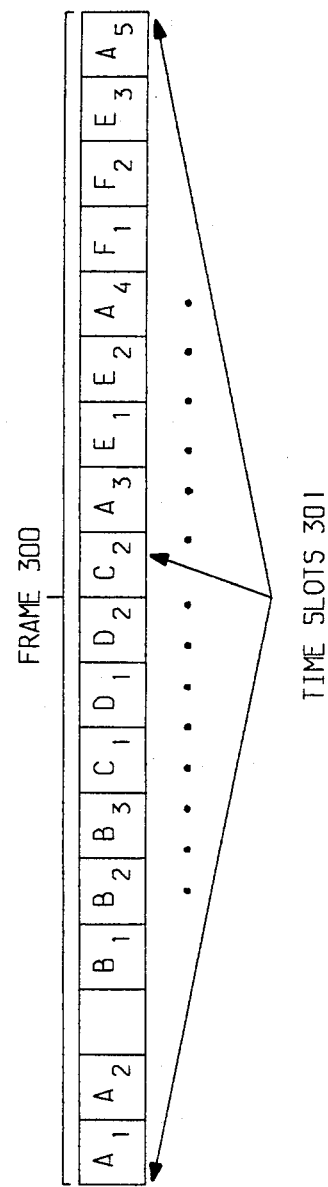
FIG. 5 is a block diagram of an illustrative subchannel assignment of time slots in a frame generated by a multiplexer or switch of the system of FIG. 1.

Once the number of basic bandwidth units that must be assigned to a subchannel has been determined, a multiplexer/demultiplexer 17 can assign any free time slots 301 within a frame 300 to those units. There is no constraint on the selection of time slots 301 for assignment. The only constraint is in the ordering of the mapping between the incoming bytes 210 and outgoing time slots 301 at a multiplexer 17, and between the incoming and outgoing time slots 301 at switch 20: when bytes 210 of a subchannel are time-division multiplexed into a signal stream on a link 19, they must be retained in that stream in the same relative time ordering as they had on a link 16. That means that if byte "A" precedes byte "B" on link 16 and if both bytes "A" and "B" appear in the same frame 300, byte "A" must be carried by a time slot 301 that precedes a time slot 301 that carries byte "B"; if bytes "A" and "B" appear in different frames 300, byte "A" must appear in a frame 300 that precedes a frame 300 that carries byte "B". In a departure from the prior art, time slots 301 that may be assigned to a subchannel need not be either contiguous or periodically—evenly—distributed within a frame 300, but may be located anywhere within frame 300. Consequently, a link 19 can transport a subchannel as long as it has sufficient free bandwidth for that subchannel, irrespective of how that bandwidth is distributed. FIG. 5 gives an illustrative example of such random distribution within a frame 300 of time slots 301 assigned to five different subchannels designated as A through F. Consequently, bandwidth of a link 19 can be utilized much more efficiently than has hitherto been possible.

The random time-slot-assignment format illustrated in FIG. 5 can be made compatible with the conventional DDS SDM format. The selection of bandwidth for the SDM format is limited to patterns of time slots equally spaced in time. Hence, any requisite SDM assignments can be made first, before any assignments are made to subchannels not requiring SDM compatibility, and subsequent assignments of non-SDM compatible subchannels can be made in such a way as to maximize the possibility that any remaining free time slots could be assigned to an SDM-format subchannel.

The random distribution of subchannel bandwidth within a multiplexed channel does create a modicum of complexity for switch 18 in switching subchannels between links 19. In order to accomplish the switching, switch 18 demultiplexes incoming multiplexed channels and remultiplexes their constituent subchannels into new, outgoing, multiplexed channels, using time-slot interchange techniques. In doing so, switch 18 must ensure that bytes 310, i.e., time slots 301, of a subchannel arrive at their destination in the same order in which they were transmitted from their origin. It is substantially this portion of the switch's task that is made more difficult—and some would say impossible—by the random distribution of subchannel bandwidth within a frame 300.

Figure 6:
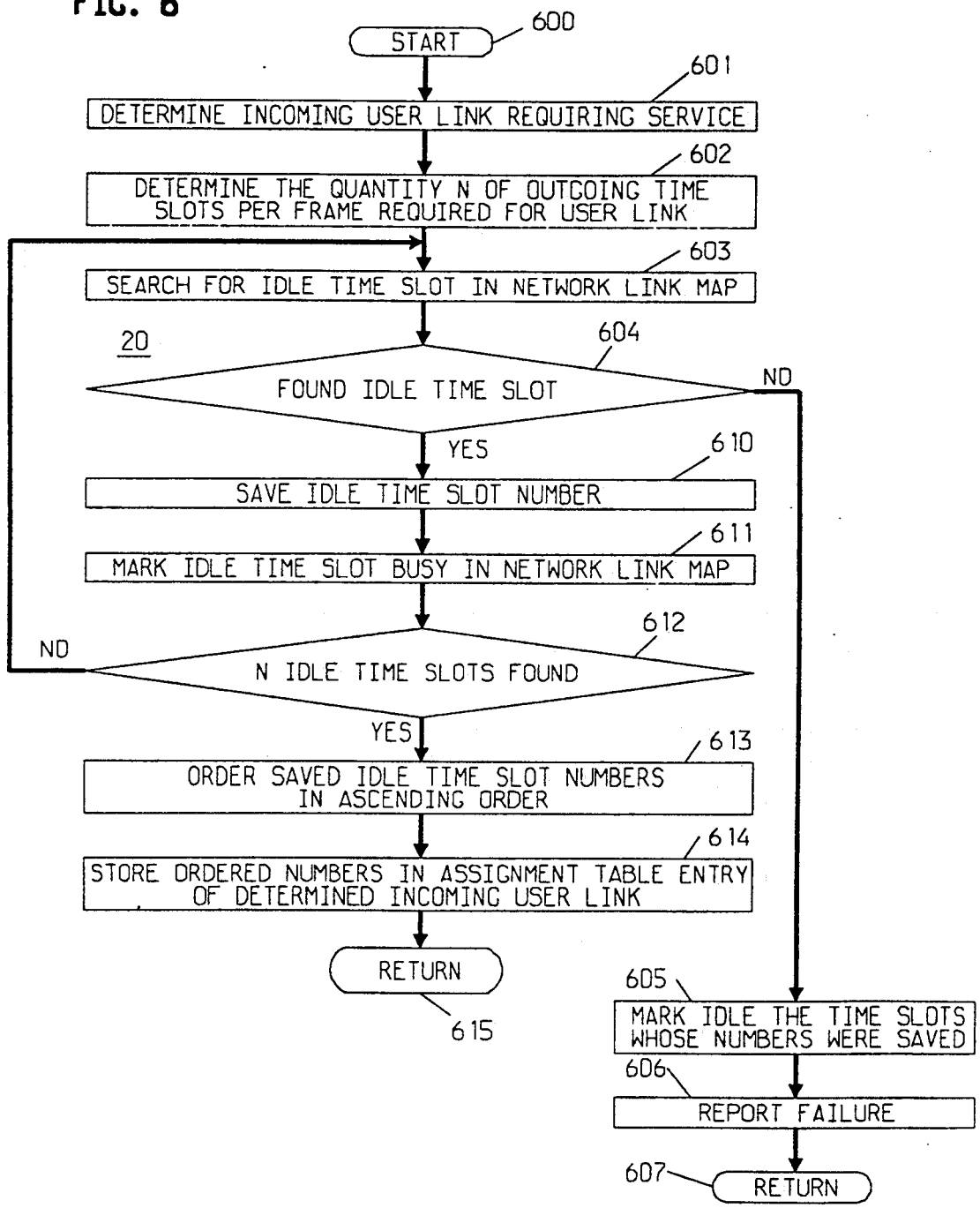
FIG. 6 is a flow diagram of a time slot assignment routine of a multiplexer of the system of FIG. 1.
Figure 7:
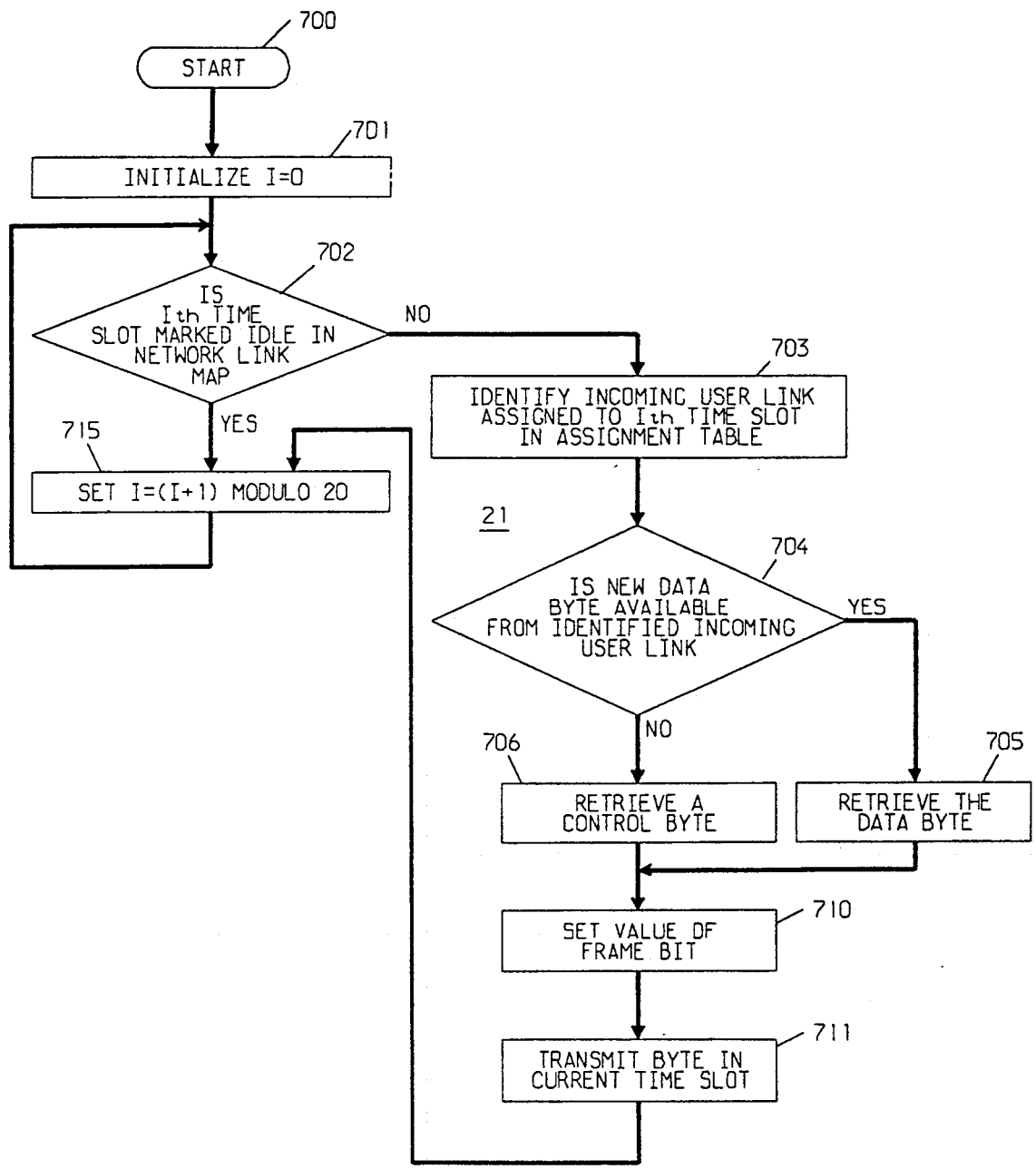
FIG. 7 is a flow diagram of a multiplexing routine of a multiplexer of the system of FIG. 1.
Figure 8:
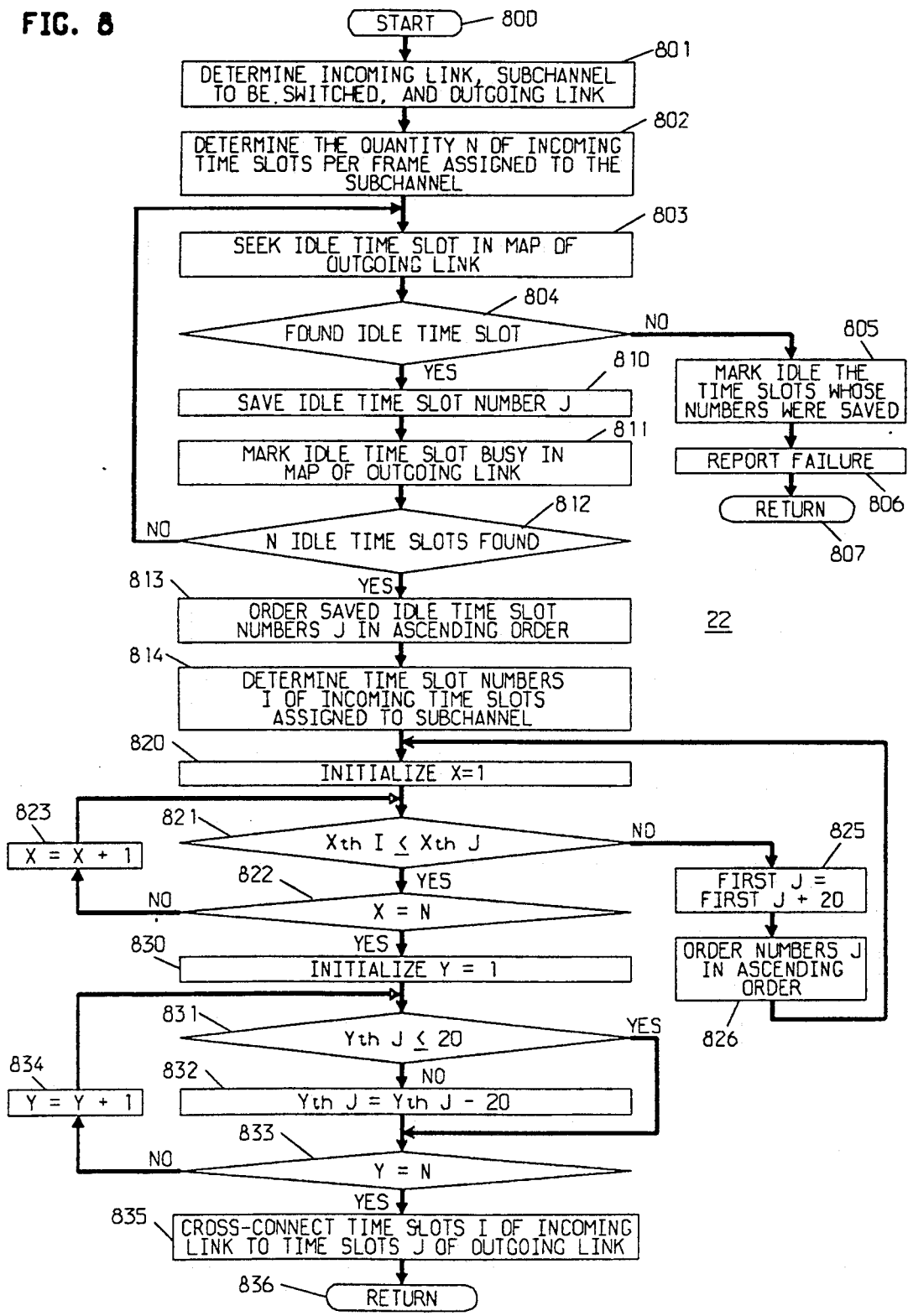
FIG. 8 is a flow diagram of a time slot mapping and switching routine of the switch of the system of FIG. 1.

To ensure that the requisite, just-discussed, relationships are maintained, each multiplexer 17 operates under control of routines 20 and 21, flowcharted in FIGS. 6 and 7, respectively, and switch 18 operates under control of routine 22 flowcharted in FIG. 8. Both multiplexers 17 and switch 18 are processor-controlled machines, as is conventional. Their respective processors have memories that store the appropriate routines and central processing units that execute the stored routines, in a conventional manner.

A multiplexer 17 executes routine 20 of FIG. 6 when one of its incoming subscriber links 16 is being activated. Upon starting to execute, at step 600, routine 20 determines which one of the subscriber lines 16 requires service, at step 601. Illustratively, this information is passed to routine 20 as a parameter upon its invocation. Routine 20 then determines the quantity N of outgoing time slots 301 per frame 300 that are required to service the link 16, at step 602. Illustratively, the required number is the number of time slots 301 needed to form a bandwidth equal to the nominal data rate of the user link 16 being serviced, plus one. Illustratively, the number N is also passed to routine 20 as a parameter upon its invocation.

A multiplexer 17 includes a conventional map of time slots 301 of outgoing frames 300 of the connected network link 18, which map specifies for each time slot 301 whether it is idle, i.e., unassigned to a user link 16, or busy, i.e., assigned to a link 16. Knowing the number N of time slots 301 needed to service a user link 16, routine 20 proceeds to search the map for a time slot that is marked idle, at step 603. If an idle time slot is found, as determined at step 604, routine 20 assigns it to serve the user link 16: routine 20 saves the sequence number which that idle time slot 301 has within the sequence of 20 time slots 301 that make up a frame 300, at step 610, and marks the idle time slot as busy in the map, at step 611. Routine 20 then checks whether it has found the requisite number N of idle time slots, 301, at step 612. If N idle time slots have not been found yet, routine 20 returns to step 603 to search the map for yet another idle time slot 301.

If an idle time slot 301 is not found, as determined at step 604, it means that insufficient idle bandwidth exists on network link 19 to service the user link 16. Routine 20 therefore releases the idle time slots 301 that it has so far assigned to serve the user link 16, at step 605, by marking as idle the time slots 301 whose sequence numbers it has saved at step 610. Routine 20 then conventionally reports a failure to serve the user link 16, at step 606, and returns to the point of its invocation, at step 607.

Returning to step 612, if and when the requisite number N of idle time slots 301 has been found and assigned to serve the user link 16, routine 20 orders their saved sequence numbers in ascending order, at step 613. Multiplexer 17 includes a conventional assignment table which has, for each connected user link 16, an entry that records the outgoing time slots 301 assigned to serve that user link 16, and routine 20 stores the ordered sequence numbers in the entry of the user link 16 that is being activated, at step 614. Routine 20 then returns to the point of its activation, at step 615.

To perform its multiplexing functions, a multiplexer 17 executes routine 21 of FIG. 7. When multiplexer 17 is activated, execution of routine 21 is started, at step 700, and a counter I is initialized to zero, at step 701. The remainder of routine 21 is then executed once every time slot period.

Counter I is a sequential counter of the time slots 301 within a frame 300. As there are 20 time slots 301 (numbered 0 through 19) in a frame 300, counter I operates in modulo 20 form, as suggested by step 715, as operation of routine 21 moves from frame 300 to subsequent frame 300.

At the start of a time slot 301 interval, routine 21 checks, at step 702, whether the Ith sequential time slot 301 is marked as idle in the map of network link 19 that was referred to above. If so, routine 21 need not do anything else during this time slot interval, so it merely increments the value of counter I by 1 modulo 20, at step 715, and returns to step 702.

If the Ith time slot 301 is not found at step 702 to be marked idle, routine 21 searches the assignment table that was referred to above in order to identify the user link 16 to which the Ith time slot 301 is assigned, at step 703. Having identified the user link 16, routine 21 checks, at step 704, whether a new byte 210 of data has been received from that user link 16 since a time slot 301 serving that user link 16 has last been processed and hence is available for transmission. If a new data byte 210 is available, routine 21 retrieves it, at step 705; if a new data byte 210 is not available, routine 21 retrieves a control byte 210 of that user link 16, at step 706. The retrieved control byte 210 may be a "new" control byte, that is, one that has been recently received from user link 16 and has not yet been transmitted on network link 19. Or, it may be an "old" control byte, that is, one that has already been transmitted on network link 19, if a "new" control byte has not been received and has not supplanted the "old" byte. Routine 21 does not distinguish between "old" and "new" control bytes and merely retrieves whichever one is available.

In an alternative embodiment, a byte of a secondary data channel or some other information could be sent instead of an "old" control byte.

Following step 705 or 706, routine 21 sets the value of frame bit 202 of the retrieved byte 210 to the value appropriate for the Ith time slot 301 of a frame 300 (see FIG. 3), at step 710, and transmits the retrieved byte 210 in the current time slot 301 of the current frame 300 on network link 19. Its task for the current time slot interval is done, and routine 21 proceeds to increment the value of counter I by 1 modulo 20, at step 715, and returns to step 702.

Switch 18 executes routine 22 of FIG. 8 in response to receiving a request to switch a subchannel from one of its incoming network links 19 to one of its outgoing network links 19. Upon starting to execute, at step 800, routine 22 determines which subchannel is to be switched from which incoming link 19 to which outgoing link, at step 601. Illustratively, this information is passed to routine 22 as a parameter upon its invocation. Routine 22 then determines the quantity N of incoming time slots 301 that are assigned to the subchannel, at step 802. Again, this information is illustratively passed to routine 22 as a parameter.

Like a multiplexer 17, switch 20 includes a map of time slots 301 of frames 300 for each connected network link 19, and the maps specify which time slots 301 are idle and which are busy. Routine 22 searches the map of the specified outgoing link 19 for an idle time slot, at step 803. If an idle time slot is found, as determined at step 804, routine 22 assigns it to serve the subchannel to be switched, by saving the time slot's sequence number J, at step 810, and marking the time slot as busy in the map, at step 811. Routine 22 then checks whether it has found the requisite number N of idle time slots 301, at step 812. If not, routine 22 returns to step 803 to search the map for yet another idle time slot 301.

If an idle time slot 301 is not found, as determined at step 804, it means that insufficient idle bandwidth exists on outgoing link 19 to service the subchannel. Routine 22 therefore releases the outgoing idle time slots 301 that it has so far assigned to serve the subchannel, at step 805, by marking as idle the time slots 301 whose sequence numbers it has saved at step 810. Routine 22 then conventionally reports a failure to serve the subchannel, at step 806, and returns to the point of its invocation, at step 807.

Returning to step 812, if and when the requisite number N of idle time slots 301 has been found and assigned to serve the subchannel, routine 22 orders their saved sequence numbers J in ascending order, at step 813. Routine 22 then determines the sequence numbers I of time slots 301 that are serving the subchannel on incoming link 19, at step 814. Next, routine 22 initializes a counter X to the value of one, at step 820. Routine 22 then compares the Xth I value from the ordering obtained at step 813 with the Xth J value from the ordering obtained at step 814 to determine whether the J value equals or exceeds the I value, at step 821. If so, routine 22 checks whether the value of X equals N, i.e., whether all I and J values from steps 813 and 814 have been compared with each other, at step 822. If all I and J values have not been compared, routine 22 increments the value of X by one, at step 823, and returns to step 821 to compare the next pair of I and J values.

If each sequential I value is less than or equal to each corresponding sequential J value, as determined at step 821, it means that each incoming time slot 301 serving the switched channel occurs in a frame 300 earlier or at the same time as each corresponding outgoing time slot 301 assigned to serve the switched subchannel occurs in a frame 300, and hence all the subchannel's time slots 301 from an incoming frame 300 may be mapped to the subchannel's time slots 301 of a single outgoing frame 300, and there is no need to cross frame 300 boundaries in the mapping of incoming to outgoing time slots 301.

If, however, each sequential I value is not less than or equal to each corresponding sequential J value, as determined at step 821, it means that all the subchannel's incoming time slots 301 of a single frame 300 cannot be mapped to simultaneous or later outgoing time slots 301 of a single frame 300, and hence frame 300 boundaries must be crossed in the mapping to ensure that each incoming time slot 301 occurs at the same time as or prior to the outgoing time slot 301 to which it is mapped. Hence, if an Xth I-J pair is found at step 821 for which I is not less than or equal to J, the ordered sequence of numbers J (formed at step 813) is rotated right by one place. Rotation is accomplished by adding 20 to the first value J in the ordered sequence of J values to make sure that the first value is now the largest J value in the sequence, at step 825, and then ordering again the J values in ascending order, at step 826. Following the rotation of steps 825-826, routine returns to step 820 to repeat the I-J comparison process. In that process, the J values greater than 20 represent time slots 301 of the next subsequent outgoing frame 300.

Eventually, routine 22 finds at steps 821 and 822 that, for all pairs of I and J values, I is less than J—even though this may require that every J value will have been incremented by 20. At that point, routine 22 proceeds to normalize the J values, i.e., to reduce them to the range of 1 to 20. For this purpose, routine 22 initializes a counter Y to the value of 1, at step 830, and checks if the Yth J value is equal to or less than 20, at step 831. If not, routine 22 reduces that J value by 20, at step 832—this compensates for the 20 that had been added to that J value at step 825. Following step 832, or if the Yth J value is found to be less than or equal to 20 at step 831, function 22 checks whether Y equals N, i.e., whether all J values have been checked, at step 833. If not, function 22 increments the counter Y by one, at step 834, and returns to step 831 to check the next J value. When all J values have been checked and normalized, as determined at step 833, function 22 causes switch 22 to cross-connect individual incoming time slots 301 identified by the numbers I to the individual outgoing time slots 301 identified by the numbers J, in the order of the numbers J that remains following steps 832 and 833, at step 835. Function 22 is then done, and it returns to the point of its invocation, at step 836.

Figure 9:
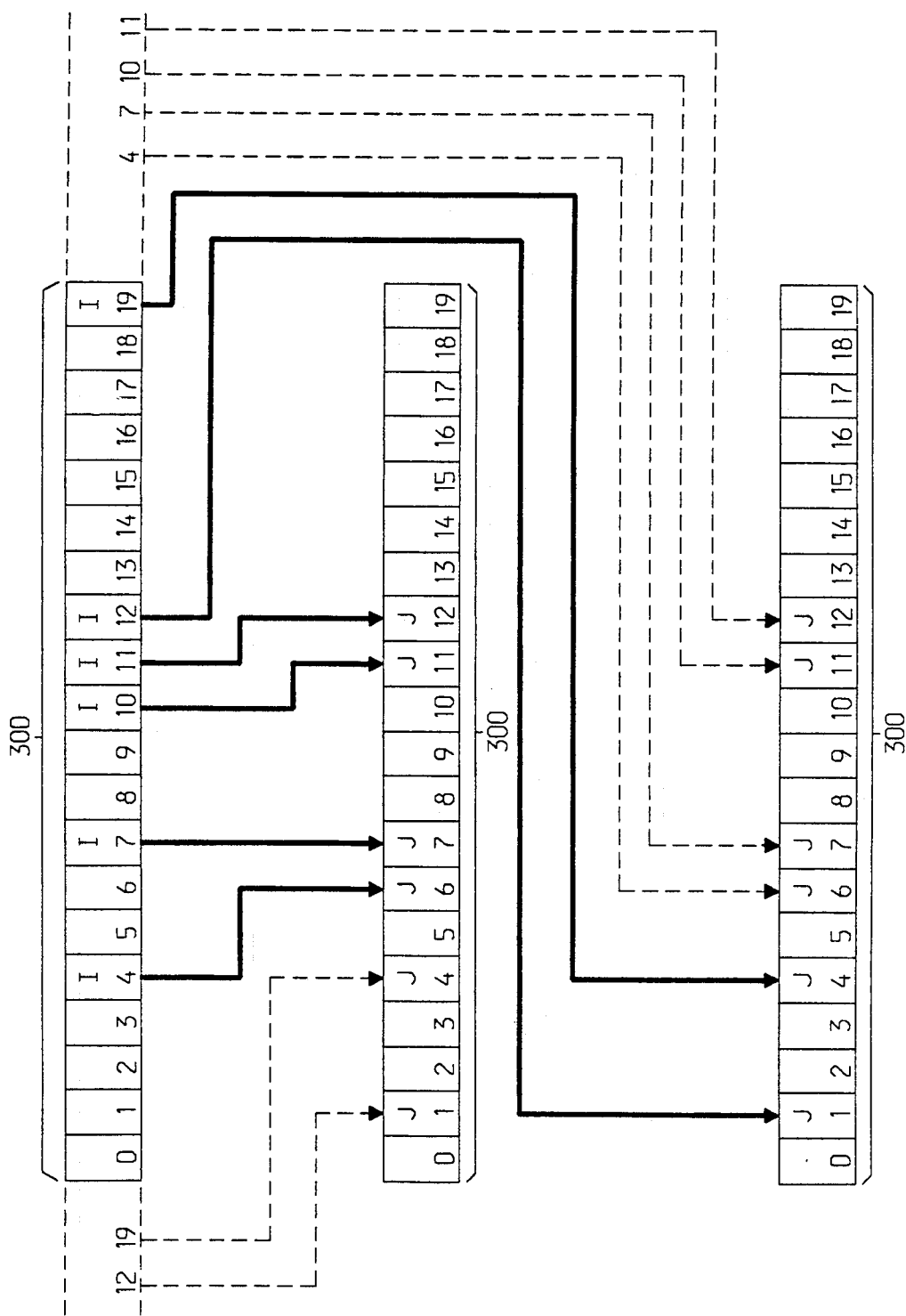
FIG. 9 is a block diagram of an illustrative time slot mapping and cross-connection produced by the routine of FIG. 8.

An illustrative example of the results of the operation of routine 22 is shown in FIG. 9. In this example, a switched subchannel designated as I occupies the 4th, 7th, 10th, 11th, 12th, and 19th time slots 301 of an incoming frame 300, and has been assigned the 1st (not 0th), 4th, 6th, 7th, 11th, and 12th time slots 301, designated as J, of an outgoing frame 300. The time-slot 301 pairing that results from operation of routine 22 is of the 4th incoming with the 6th presently-outgoing, 7th incoming with the 7th presently-outgoing, 10th incoming with the 11th presently-outgoing, 11th incoming with the 12th presently-outgoing, 12th incoming with the 1st next-outgoing, and 19th incoming with the 4th next-outgoing. As suggested in FIG. 9, the presently-outgoing 1st and 4th time slots 301 will be paired with incoming time slots 301 (the 12th and 19th) of the previously-incoming frame 300, and the next outgoing 6th, 7th, 11th, and 12th time slots 301 will be paired with the incoming time slots 301 (the 4th, 7th, 10th, and 11th) of the next-incoming frame 300.

Of course, it should be understood that various changes and modifications may be made to the above-described illustrative embodiment of the invention. For example, if compatibility with a format such as the DDS SDM DS0-B is not required, a time slot may carry a delineated information unit consisting of fewer or more than 8 bits. Also, the subrate-multiplexed rate need not be the DS0 rate but may be any other rate, such as a T1 or a T3 rate. Furthermore, all subrate-multiplexed rates within the system need not be the same; for example, one link 19 may have the rate of 64 Kbps while another link 19 may have the rate of 1544 Kbps. In this case, switch 18 must preserve the relationships that (a) the time order of incoming signals of a subchannel is preserved in the outgoing signal stream, and (b) incoming time slots are mapped to outgoing time slots each one of which occurs no earlier than the mapped incoming time slot. Such changes and modifications may be made without departing from the spirit and the scope of the invention. It is therefore intended that such changes and modifications be covered by the following claims.

What is claimed is:

1. A subrate multiplexer comprising:
    means for receiving a plurality of first signal streams each at a subrate of a predetermined transmission rate;
    means cooperative with the receiving means for subrate-multiplexing the plurality of received first signal streams into a second signal stream such that the second signal stream comprises a plurality of adjacent frames each having an identical sequence of time slots of equal duration with different ones of the time slots of a frame assigned to carry signals from different ones of the first signal streams and with sequentially identical time slots of a plurality of the adjacent frames assigned to a same one first signal stream;
    means cooperative with the receiving means and the subrate-multiplexing means for assigning to at least one first signal stream a plurality of time slots in each frame, at least some of the time slots of the assigned plurality being separated from others of the time slots of the assigned plurality by at least one time slot assigned to a different first signal stream and at least some of the time slots of the assigned plurality being non-periodically distributed with respect to others of the time slots of the assigned plurality within the sequence of the time slots of a frame; and
    means cooperative with the subrate-multiplexing means for transmitting the second signal stream at the predetermined transmission rate.

2. The subrate multiplexer of claim 1 wherein
    the assigning means comprise
    means for arbitrarily distributing the time slots of the assigned plurality among the sequence of time slots of a frame.

3. An arrangement for switching a first signal stream from a received subrate-multiplexed second signal stream comprising a plurality of first signal streams into a transmitted subrate-multiplexed third signal stream also comprising a plurality of first signal streams, wherein the second and the third signal streams each comprise a plurality of adjacent frames each having an identical sequence of time slots of equal duration with different ones of the time slots of a frame assigned to carry signals of different ones of the first signal streams and with sequentially identical time slots of a plurality of the adjacent frames assigned to carry signals from a same one first signal stream, comprising:

means for receiving the second signal stream comprising an individual first signal stream that is assigned a plurality of time slots in each frame of the received second signal stream, at least some of the time slots of the assigned plurality being separated from others of the time slots of the assigned plurality by at least one time slot assigned to a different first signal stream and at least some of the time slots of the assigned plurality being non-periodically distributed with respect to others of the time slots of the assigned plurality within the sequence of the time slots of a frame;

means cooperative with the receiving means for assigning a same plurality of time slots in each frame of the third signal stream to carry signals of the individual first signal stream; and means cooperative with the receiving means and the assigning means for switching signals carried by the time slots assigned to the individual first signal stream in the second signal stream into the time slots assigned by the assigning means to the individual first signal stream in the third signal stream in an order in which the signals of the individual first signal stream are received, such that the signals of the individual first signal stream appear in the same order in both the second and the third signal streams.

4. The arrangement of claim 3 wherein
the time slots of the assigned plurality in the frames of the second signal stream have an arbitrary distribution within the sequence of the time slots of each frame.

5. The arrangement of claim 3 wherein
the time slots of the assigned plurality in the frames of the third signal stream have no constraints on their distribution within the sequence of the time slots of each frame.

6. The arrangement of claim 3 wherein the time slots of the assigned plurality in the frames of the third signal stream have an arbitrary distribution with the sequence of the time slots of each frame.

7. The arrangement of claim 3 wherein at least some of the time slots of the assigned plurality are separated in the frames of the third signal stream from others of the time slots of the assigned plurality by at least one time slot assigned to a different first signal stream and at least some of the time slots of the assigned plurality are non-periodically distributed in the frames of the third signal stream with respect to others of the time slots of the assigned plurality within the sequence of the time slots of a frame.

8. The arrangement of claim 3 wherein the switching means include means for mapping sequentially-occurring time slots assigned to the individual first signal stream in a frame of the second signal stream to sequentially-occurring time slots that are both (a) assigned to the individual first signal streams in one or more adjacent frames of the third signal stream and (b) each occurring no earlier in time than its mapped time slot of the second signal stream.

9. An arrangement for switching a first signal stream from a subrate-multiplexed second signal stream comprising a plurality of first signal streams into a subrate-multiplexed third signal stream also comprising a plurality of first signal streams, wherein the second and the third signal stream each comprises a plurality of adjacent frames each having an identical sequence of time slots of equal duration with different ones of the time slots of a frame assigned to carry signals from different ones of the first signal streams and with sequentially identical time slots of a plurality of the adjacent frames assigned to carry signals from a same one first signal stream, comprising:

means for receiving the second signal stream comprising an individual first signal stream that is assigned a plurality of time slots in each frame of the second signal stream;

means cooperative with the receiving means for assigning a same plurality of time slots in each frame of the third signal stream to carry signals of the individual first signal stream, the assigned time slots in the frames of the third signal stream having no constraints on their distribution within the sequence of the time slots of each frame; and means cooperative with the receiving means and the assigning means for switching signals carried by the time slots assigned to the individual first signal stream in the second signal stream into the time slots assigned by the assigning means to the individual first signal stream in the third signal stream in an order in which the signals of the individual first signal stream are received, such that the signals of the individual first signal stream appear in the same order in both the second and the third signal streams.

10. The arrangement of claim 9 wherein the time slots of the assigned plurality in the frames of the second signal stream have no constraints on their distribution within the sequence of the time slots of each frame.

11. The arrangement of claim 9 wherein the assigned time slots in the frames of the second signal stream have an arbitrary distribution within the sequence of the time slots of each frame.

12. The arrangement of claim 9 wherein at least some of the time slots of the assigned plurality are separated in the frames of the second signal stream from others of the time slots of the assigned plurality by at least one time slot assigned to a different first signal stream and at least some of the time slots of the assigned plurality are non-periodically distributed in the frames of the second signal stream with respect to others of the time slots of the assigned plurality within the sequence of the time slots of a frame.

13. The arrangement of claim 9 wherein the assigned time slots in the frames of the third signal stream have an arbitrary distribution within the sequence of the time slots of each frame.

14. The arrangement of claim 9 wherein the switching means include means for mapping sequentially-occurring time slots assigned to the individual first signal stream in a frame of the second signal stream to sequentially-occurring time slots that are both (a) assigned to the individual first signal stream in one or more adjacent frames of the third signal stream and (b) each occurring no earlier in time than its mapped time slot of the second signal stream.

15. A telecommunications system comprising
means for receiving a plurality of first signal streams;
means cooperative with the receiving means for subrate-multiplexing the plurality of received first signal streams into a second signal stream such that the second signal stream comprises a plurality of adjacent frames each having an identical sequence of time slots of equal duration with different ones of the time slots of a frame assigned to carry signals from different ones of the first signal streams and with sequentially identical time slots of a plurality of the adjacent frames assigned to a same one first signal stream;

means cooperative with the receiving means and the subrate-multiplexing means for assigning to at least one first signal stream a plurality of time slots in each frame, the time slots of the assigned plurality in the frames of the second signal stream having no constraints on their distribution within the sequence of the time slots of each frame;

means cooperative with the subrate-multiplexing means for transmitting the second signal stream;

means for receiving the transmitted second signal stream;

means cooperative with the receiving means for assigning a same plurality of time slots to carry signals of the at least one signal stream in each frame of a third signal stream comprising a plurality of adjacent frames each having an identical sequence of time slots of equal duration with different ones of the time slots of a frame assigned to carry signals from different ones of first signal streams and with sequentially identical time slots of a plurality of the adjacent frames assigned to carry signals of a single first signal stream, the time slots of the assigned plurality in the frames of the third signal stream having no constraints on their distribution within the sequence of the time slots of each frame;

means cooperative with the assigning means and the receiving means for switching signals carried by the time slots assigned to the at least one first signal stream in the second signal stream into the time slots assigned by the assigning means to the at least one first signal stream in the third signal stream in an order in which the signals of the individual at least one signal stream are received, such that the signals of the at least one signal stream appear in the same order in both the second and the third signal streams; and means cooperative with the switching means for transmitting the third signal stream.

16. The system of claim 15 wherein the switching means include means for mapping sequentially-occurring time slots assigned to the individual first signal stream in a frame of the second signal stream to sequentially-occurring time slots that are both (a) assigned to the individual first signal stream in one or more adjacent frames of the third signal stream and (b) each occurring no earlier in time than its mapped time slot of the second signal stream.

17. The system of claim 15 further comprising means for receiving the transmitted third signal stream;

means for demultiplexing the received third signal stream into its constituent first signal streams; and means for individually transmitting each of the constituent first signal streams.

18. A subrate multiplexing method comprising the steps of:

receiving a plurality of first signal streams each at a subrate of a predetermined transmission rate;

assigning to at least one first signal stream a plurality of time slots in each frame of a second signal stream comprising a plurality of adjacent frames each having an identical sequence of time slots of equal duration with different ones of the time slots of a frame assigned to carry signals from different ones of the first signal streams and with sequentially identical time slots of a plurality of the adjacent frames assigned to a same one first signal stream, at least some of the time slots of the assigned plurality being separated from others of the time slots of the assigned plurality by at least one time slot assigned to a different first signal stream and at least some of the time slots of the assigned plurality being non-periodically distributed with respect to others of the time slots of the assigned plurality within the sequence of the time slots of a frame;

subrate-multiplexing the plurality of received first signal streams into the second signal stream such that the signals of the at least one first signal stream are carried in each frame by the time slots of the assigned plurality; and transmitting the second signal stream at the predetermined transmission rate.

19. The subrate multiplexing method of claim 18 wherein the step of assigning comprises the step of arbitrarily distributing the time slots of the assigned plurality among the sequence of time slots of a frame.

20. A method of switching a first signal stream from a received subrate-multiplexed second signal stream comprising a plurality of first signal streams into a transmitted subrate-multiplexed third signal stream also comprising a plurality of first signal streams, wherein the second and the third signal streams each comprise a plurality of adjacent frames each having an identical sequence of time slots of equal duration with different ones of the time slots of a frame assigned to carry signals of different ones of the first signal streams and with sequentially identical time slots of a plurality of the adjacent frames assigned to carry signals from a same one first signal stream, comprising the steps of:

receiving the second signal stream comprising an individual first signal stream that is assigned a plurality of time slots in each frame of the received second signal stream, at least some of the time slots of the assigned plurality being separated from others of the time slots of the assigned plurality by at least one time slot assigned to a different first signal stream and at least some of the time slots of the assigned plurality being non-periodically distributed with respect to others of the time slots of the assigned plurality within the sequence of the time slots of a frame;

assigning a same plurality of time slots in each frame of the third signal stream to carry signals of the individual first signal stream; and switching signals carried by the time slots assigned to the individual first signal stream in the second signal stream into the time slots assigned by the assigning step to the individual first signal stream in the third signal stream in an order in which the signals of the individual first signal stream are received, such that the signals of the individual first signal stream appear in the same order in both the second and the third signal streams.

21. The method of claim 20 wherein the step of receiving comprises the step of receiving the second signal stream wherein the time slots of the assigned plurality in the frames of the second signal stream have an arbitrary distribution within the sequence of the time slots of a frame.

22. The method of claim 20 wherein the step of assigning comprises the step of assigning to the individual first signal stream the plurality of time slots without constraints on distribution of the assigned time slots within the sequence of the time slots of a frame.

23. The method of claim 20 wherein the step of assigning comprises the step of assigning to the individual first signal stream the plurality of time slots having an arbitrary distribution within the sequence of the time slots of a frame.

24. The method of claim 20 wherein the step of assigning comprises the step of assigning to the individual first signal stream the plurality of time slots such that at least some of the time slots of the assigned plurality are separated in the frames of the third signal stream from others of the time slots of the assigned plurality by at least one time slot assigned to a different first signal stream and at least some of the time slots of the assigned plurality are non-periodically distributed in the frames of the third signal stream with respect to others of the time slots of the assigned plurality within the sequence of the time slots of a frame.

25. The method of claim 20 wherein the step of switching includes the step of mapping sequentially-occurring time slots assigned to the individual first signal stream in a frame of the second signal stream to sequentially-occurring time slots that are both (a) assigned to the individual first signal stream in one or more adjacent frames of the third signal stream and (b) each occurring no earlier in time than its mapped time slot of the second signal stream.

26. A method of switching a first signal stream from a subrate-multiplexed second signal stream comprising a plurality of first signal streams into a subrate-multiplexed third signal stream also comprising a plurality of first signal streams, wherein the second and the third signal stream each comprises a plurality of adjacent frames each having an identical sequence of time slots of equal duration with different ones of the time slots of a frame assigned to carry signals from different ones of the first signal streams and with sequentially identical time slots of a plurality of the adjacent frames assigned to carry signals from a same one first signal stream, comprising the steps of:

receiving the second signal stream comprising an individual first signal stream that is assigned a plurality of time slots in each frame of the second signal stream;

assigning a same plurality of time slots in each frame of the third signal stream to carry signals of the individual first signal stream, the assigned time slots in the frames of the third signal stream having no constraints on their distribution within the sequence of the time slots of each frame; and switching signals carried by the time slots assigned to the individual first signal stream in the second signal stream into the time slots assigned by the assigning step to the individual first signal stream in the third signal stream in an order in which the signals of the individual first signal stream are received, such that the signals of the individual first signal stream appear in the same order in both the second and the third signal streams.

27. The method of claim 26 wherein the step of receiving comprises the step of receiving the second signal stream wherein the time slots of the assigned plurality in the frames of the second signal stream have no constraints on their distribution within the sequence of the time slots of a frame.

28. The method of claim 26 wherein the step of receiving comprises the step of receiving the second signal stream wherein the assigned time slots in the frames of the second signal stream have an arbitrary distribution within the sequence of the time slots of a frame.

29. The method of claim 26 wherein the step of receiving comprises the step of receiving the second signal stream wherein at least some of the time slots of the assigned plurality are separated in the frames of the second signal stream from others of the time slots of the assigned plurality by at least one time slot assigned to a different first signal stream and at least some of the time slots of the assigned plurality are non-periodically distributed in the frames of the second signal stream with respect to others of the time slots of the assigned plurality within the sequence of the time slots of a frame.

30. The method of claim 26 wherein the step of assigning comprises the step of assigning to the individual first signal stream the plurality of time slots having an arbitrary distribution within the sequence of the time slots of a frame.

31. The method of claim 26 wherein the step of switching includes the step of mapping sequentially-occurring time slots assigned to the individual first signal stream in a frame of the second signal stream to sequentially-occurring time slots that are both (a) assigned to the individual first signal stream in one or more adjacent frames of the third signal stream and (b) each occurring no earlier in time than its mapped time slot of the second signal stream.

32. A method of telecommunicating in subrate-multiplexed form, comprising the steps of:

receiving a plurality of first signal streams;

assigning a plurality of time slots to carry signals of at least one first signal stream in each frame of a second signal stream comprising a plurality of adjacent frames each having an identical sequence of time slots of equal duration with different ones of the time slots of a frame assigned to carry signals from different ones of the first signal streams and with sequentially identical time slots of a plurality of the adjacent frames assigned to carry signals of a same one first signal stream, the time slots of the assigned plurality in the frames of the second signal stream having no constraints on their distribution within the sequence of the time slots of each frame;

subrate-multiplexing the plurality of received first signal streams into the second signal stream such that the signals of the at least one first signal stream are carried in each frame by the time slots of the assigned plurality;

transmitting the second signal stream;

receiving the transmitted second signal stream;

assigning a same plurality of time slots to carry signals of the at least one first signal stream in each frame of a third signal stream comprising a plurality of adjacent frames each having an identical sequence of time slots of equal duration with different ones of the time slots of a frame assigned to carry signals from different ones of first signal streams and with sequentially identical time slots of a plurality of the adjacent frames assigned to carry signals of a single first signal stream, the time slots of the assigned plurality in the frames of the third signal stream having no constraints on their distribution within the sequence of the time slots of each frame;

switching signals carried by the time slots assigned to the at least one first signal stream in the second signal stream into the time slots assigned by the step of assigning time slots in each frame of a third signal stream to the at least one first signal stream in the third signal stream in an order in which the signals of the individual at least one signal stream are received, such that the signals of the at least one signal stream appear in the same order in both the second and the third signal streams; and transmitting the third signal stream.

33. The method of claim 32 wherein the step of switching includes the step of mapping sequentially-occurring time slots assigned to the individual first signal stream in a frame of the second signal stream to sequentially-occurring time slots that are both (a) assigned to the individual first signal stream in one or more adjacent frames of the third signal stream and (b) each occurring no earlier in time than its mapped time slot of the second signal stream.

34. The method of claim 32 further comprising the steps of:

receiving the transmitted third signal stream;

demultiplexing the received third signal stream into its constituent first signal streams; and transmitting individually each of the constituent first signal streams.

* * * * *